United States Patent
Negele et al.

[11] Patent Number: 5,912,081
[45] Date of Patent: Jun. 15, 1999

[54] METHOD AND PAINT FIRM FOR PAINTING AN OBJECT DURING A CREATIVE SHAPING

[75] Inventors: Oswin Negele, Korb; Karl Holdik, Ulm, both of Germany

[73] Assignee: Daimler-Benz Aktiengesellschaft, Stuttgart, Germany

[21] Appl. No.: 08/895,232

[22] Filed: Jul. 16, 1997

[30] Foreign Application Priority Data

Jul. 18, 1996 [DE] Germany .......................... 196 28 966

[51] Int. Cl.⁶ .............................. B32B 27/00; B32B 27/40
[52] U.S. Cl. ........................ 428/423.1; 264/255; 264/259; 264/402; 264/403; 264/404; 427/133; 427/553; 428/522
[58] Field of Search ...................... 264/255, 259, 264/402, 403, 404; 427/133, 553; 428/423.1, 522

[56] References Cited

U.S. PATENT DOCUMENTS

| | | | |
|---|---|---|---|
| 4,389,454 | 6/1983 | Horacek et al. | 264/255 X |
| 5,164,127 | 11/1992 | Boeckeler | 264/255 X |
| 5,252,265 | 10/1993 | Cirri | 264/255 X |

FOREIGN PATENT DOCUMENTS

| | | |
|---|---|---|
| 0 361 351 | 4/1990 | European Pat. Off. . |
| 42 28 194 | 3/1994 | Germany . |

*Primary Examiner*—Michael Lusignan
*Attorney, Agent, or Firm*—Evenson, McKeown, Edwards & Lenahan P.L.L.C.

[57] ABSTRACT

The invention relates to a method for painting an object during a creative shaping process, for example an injection-molding, extrusion-molding, or back-foaming method with a paint film, as well as a paint film for working the method. In the method, a paint film is placed in an open mold that internally has the original shape of the part. The mold is closed and filled with a starting material, with the starting material curing and/or bonding and/or reacting inside the mold to at least shape the object. To simplify the method, the paint in the paint layer of the paint film is partially cured and/or partially crosslinked before the starting material is added, without adhesive, and is cured only during and/or after the starting material is placed in the mold.

28 Claims, 2 Drawing Sheets

METHOD AND PAINT FIRM FOR PAINTING AN OBJECT DURING A CREATIVE SHAPING

BACKGROUND AND SUMMARY OF THE INVENTION

This application claims the priority of German No. 196 28 966.1-43, filed Jul. 18, 1996, the disclosure of which is expressly incorporated by reference herein.

This invention relates to a method for painting an object during a creative shaping process as well as a paint film for working the method.

A method for applying a paint film with back-spraying of the paint film in a mold is known from DE 42 28 194 A1. In this method, a paint is applied to a surface of a carrier film. The carrier film wetted with the paint is either placed in the mold for back-spraying before the paint is applied or is placed in the mold with the paint still wet. Then the mold is closed and the paint film is back-sprayed in a shaping manner while the paint is still wet, to produce the object. Then the object thus produced is removed from the mold and the carrier film is removed. Since this involves the paint film having to be placed in the mold with wet paint before the object is shaped, this method is difficult to put into practice. In addition, the object must either remain in the mold until the paint has dried or must be stored outside the mold until it cures. This means either that the possible cycling rate of the mold is reduced or that a large supply of these molds is required. In addition, the carrier film must be removed and disposed of after the paint has cured.

A paint film is known from EP 361 351 A1 that is provided for painting three-dimensional convex surfaces of dimensionally stable, prefabricated objects. The paint film has a carrier film, an adhesive layer, and a paint layer. Before the paint film is applied, the radiation-curable paint in the paint layer on the paint film is partially cured in such fashion that it is dust-dry. Then the paint film is heated and applied to the object, which also may be heated. Following application of the paint film, the paint in the paint film is final-cured with heat, with the binding reaction between the adhesive layer and the paint layer and the object taking place simultaneously.

A paint film of this kind can be used for creative shaping only under certain conditions, in other words, when there is sufficient residual elasticity. In addition, in this application, during the heating that is required for curing the paint, thermal expansion of an object made by back-foaming or back-injection can occur, and as a result the quality of the paint application can be adversely affected.

As already mentioned, such paint films have a carrier film which, when the carrier film is located in the middle, remains on the product or, when the carrier film is on the outside, is removed and possibly recycled after application of the paint film. In both cases, the material cost is high so that the weight of the paint film used for painting and the manufacturing costs are both high.

An object of the invention is to provide an improved method and the paint film so that they can be used more simply and universally.

The object is achieved according to the invention by providing a method for painting an object during a creative forming process, for example an injection-molding, diecasting, or back-foaming method comprising placing a paint film in an open mold that has the shape of the object on the inside, wherein paint film comprises a paint layer, closing the mold, partially curing or partially crosslinking the paint in the paint layer, then filling the mold with a starting material, and curing, hardening, and/or reacting the starting material inside the mold to form the object, wherein the paint layer is cured in the mold only during and/or after the starting material is placed in the mold; and a paint film for painting an object during a creative shaping process, for example an injection-molding, diecasting or back-foaming method, with a paint layer and an adhesive layer, wherein the paint in the paint layer (1) is partially cured without an adhesive before it is placed in a mold (19) and wherein the paint in the paint layer (1) may be final-cured by electromagnetic radiation.

By using a paint film with a partially cured paint that can be final-cured by electromagnetic radiation in a suitable wavelength range which would be known to those skilled in the art, the object can be subjected to a low stress during the curing and final curing of the paint in the paint layer on the paint film. It is important to note in this regard that during final curing of the paint layer by means of electron radiation, the electron beams are to be viewed in the wave pattern, in other words in terms of their wavelength.

In particular, it is also advantageous to manufacture a paint film that has only one paint layer and one adhesive layer, since in this case the carrier film that was formerly provided can be eliminated, said film therefore not having to be removed separately from the substrate to which the paint film is applied, as was formerly necessary in the case of a carrier film located on the outside, especially when that substrate is a body of an automobile, or, in the case of a carrier film that was formerly located in the middle, remains on the vehicle body.

Other objects, advantages and novel features of the present invention will become apparent from the following detailed description of the invention when considered in conjunction with the accompanying drawings.

BRIEF DESCRIPTION OF THE DRAWINGS

FIG. 1 shows a three-dimensional convex object 5 produced by back-injection to which a paint film 8 has been applied. Paint film 8 consists of a paint layer 1 and an adhesive layer 4. Ideally a reactivatable adhesive is used for adhesive layer 4, since this allows the entire paint film 8 to be stored temporarily in roll form in simple fashion.

Figure 1:
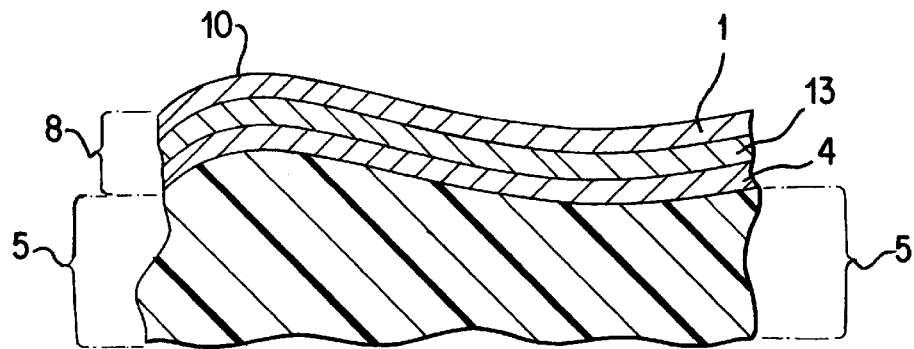
FIG. 1 is an enlarged cross-sectional view of a paint film applied to an object.

Paint film 8 may also have a stabilizing carrier film 13 which in the present case is located in the middle, in other words between adhesive 4 and paint layer 1. Depending on the application, however, carrier film 13 can be located externally, in other words on visible side 10.

Paint layer 1 is composed of a paint that is partially curable and/or partially crosslinkable and which can be final-cured after partial curing by electromagnetic radiation whose wavelength is below the visible spectrum. By choosing this material for the paint, the paint in paint layer 1 can be partially cured prior to the application of paint film 8 and before its intermediate storage as roll 9, without sticking and in dust-dry condition. Electromagnetic radiation 2, especially infrared, heat, ultraviolet, and/or electron radiation or the like, is used for partial curing.

In addition, it is advisable to choose as paint layer 1 a paint with a glass transition temperature below 40° C., especially below 30° C. During the application of paint film 8 to object 5, in other words during back-injection or back-foaming, partially cured paint layer 1 can be heated to its glass transition temperature or slightly above so that paint film 8 can be applied or back-injected free of bubbles and creases and without an orange-peel surface. The energy applied to heat the paint can advantageously be provided by heating the material to be applied at the back, for example by preheating and/or exothermal reaction.

Choosing the materials in paint film 8 with the heating temperature in mind ensures that there will be no permanent damage or destruction of object 5 by heat.

Paint film 8, which in the creative shaping process, in this case an injection molding process, is advantageously placed in a mold in an elastic state, is exposed during the final curing of the paint in paint layer 1 especially to electromagnetic radiation whose wavelength is below that of the visible spectrum. Electron beams are also covered by this definition, which because of the wave-particle duality that exists in the wave chamber must also be considered in terms of their wavelength.

Paint layer 1 is final-cured or final-crosslinked by this electromagnetic radiation. As a result of this form of final curing of paint layer 1 during advantageously simultaneous radiation curing of adhesive layer 4, especially the activatable variety, the materials of object 5 may be stressed slightly.

As a result of the choice of the material in the paint in paint layer 1 according to the invention, paint film 8 can be applied thermoplastically and crosslinked by thermosetting after it has been applied.

It is especially advantageous if phosphazene and/or phosphazene resin and/or their derivatives and/or their preproducts are used as binders for paint layer 1 or, in the case when paint layer 1 has a multilayered structure, at least for the outer layers. Such paint films 8, in addition to good workability during manufacturing and application, also exhibit excellent scratch resistance.

In addition, these paint films can be made with good environmental acceptability so that measures necessary to protect the environment are largely reduced. Moreover, these paint films 8 can be manufactured economically.

It should be mentioned as another advantage of these paint films 8 that they are thermoplastic after partial curing, while following final curing, after paint film 8 has been applied, they can be crosslinked and thermoset. Therefore the final applied paint films 8 can be ground and polished. In the event of minor damage, the polishing and grinding ability has the advantage that objects coated with such paint films can be repaired simply.

This circumstance is especially favorable when paint films 8 of this kind are used as high-quality decorative films, since these have so far been made mostly as fluorothermoplasts (PVDF for example) by a cost-intensive process and in an environmentally unfavorable manner. In addition, paint films made of PVC and PVDF cannot be polished or ground, so that repairs cannot be made to small areas.

Furthermore, in view of the low scratch resistance of paint film 8, it may be advisable to select urethane and/or its derivatives and/or its preproducts as the binder for paint layer 1 or, when paint layer 1 has a multilayered structure, at least on the outside.

Another possibility for the binder is to choose acrylates and/or their derivatives and/or their preproducts.

Figure 2A:
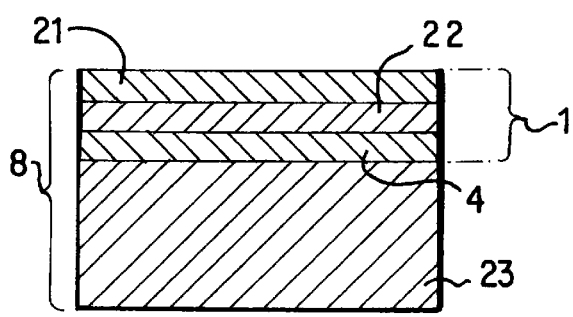
FIGS. 2a, 2b, 2c, 2d, 2e, and 2f are enlarged cross-sectional views showing a paint film for deep drawing and several method steps of an associated method for back-foaming or back-injection of the paint film.

FIG. 2a shows a paint film 8 that is especially suitable for back-foaming or back-injection with plastic. The paint film 8 that is preferred for such a method according to FIG. 2a has the following layered or laminar structure: outer layer 21 on the visible side is made of clear lacquer, layer 22 on top of this is a color- and/or effect-producing layer, the next layer is an adhesive layer 4, and the last layer, in other words the layer exposed to back-injection, is a material layer 23 which can be connected monolithically during back-injection with the material being back-injected, in particular without adding other substances. This material layer is preferably made of the same material as the material to be back-injected.

In FIGS. 2b to 2f, several method steps of a corresponding creative shaping method, especially a back-foaming method for making an object 15 decorated with a paint film 8 and back-foamed (see FIG. 2f), are shown.

Figure 2B:
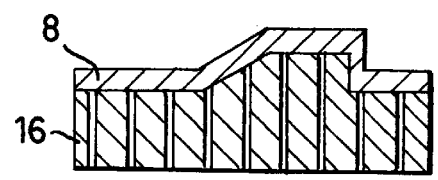
Figure 2C:
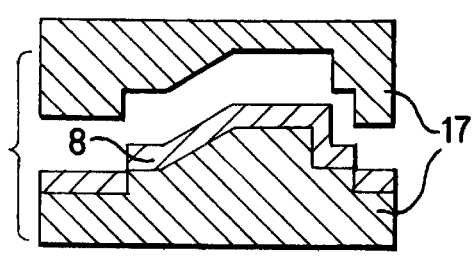
Figure 2D:
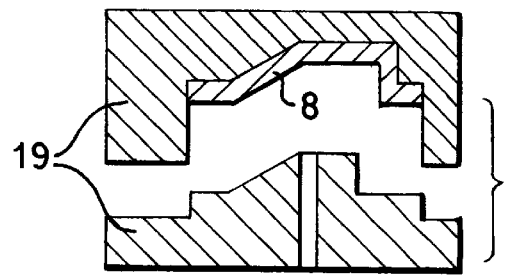
Figure 2E:
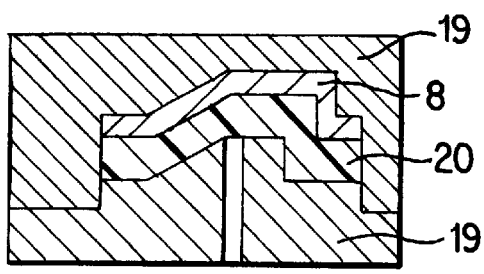
Figure 2F:
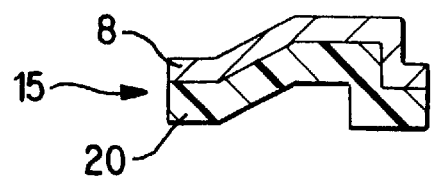

In FIG. 2b, the paint film is heated, preferably to a temperature in the vicinity of the glass transition temperature of paint layer 1 of paint film 8 and deep-drawn using a male mold 16 with a vacuum, especially free of creases. Deep-drawn paint film 8, as shown in FIG. 2c, is punched out in a punching tool 17 to match a desired circumferential contour.

The punched and deep-drawn paint film 8 is placed in an injection mold 19 and back-injected with a plastic 20. Back-injection advantageously takes place in the vicinity of the glass transition temperature of paint layer 1. For precision molding of the back-injected object that is produced and completely decorated, elastic paint film 8 can simultaneously be pressed during back-injection against the boundaries of mold 19 that are machined negatively to the desired shape of object 15. After back-injected plastic 20 has cured, final-decorated object 15 is removed from mold 19 and paint layer 8 is cured with thermosetting by radiation hardening.

When paint layer 1 has a multilayered structure as shown in FIG. 2a, only outer layer 21, which in this case is formed by clear lacquer, can be cured with a coloring and/or effect-producing layer 22 of paint layer 1 remaining thermoplastic. The term "effect-producing layer" refers especially to those layers that contain pigments with oriented three-dimensionally crosslinked liquid-crystal substances with a chiral phase that lend pigments a color that depends on the viewing angle. Such pigments are known in particular from EP 601 483 B1. This makes sense because radiation curing of color- and/or effect-producing layer 22 is costly from the standpoint of the apparatus required.

If the color-producing and/or effect-producing layer nevertheless is to be cured by thermosetting, coloring and/or effect-producing layer 22 is advantageously final-cured by electron beams.

In a method of this kind, paint film 8 is especially valuable as shown in FIG. 2a. The layered or laminar structure of the paint film is as follows: clear lacquer, color and/or effect layer, possibly an adhesive layer, and finally, in other words facing the back-injection, a layer of material which can be bonded monolithically during back-injection with the material to be back-injected without adding additional substances. This material layer is preferably made of the same material as the material to be back-injected.

In the following claims, the term "curing" is meant to encompass curing, cross-linking, reacting, or any other step well-known in the art to denote partial or complete hardening of a polymeric binder or the like.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for painting an object during a creative forming process, comprising placing a paint film in an open mold that has the shape of the object on the inside, wherein said paint film comprises a paint layer, closing the mold, partially curing the paint in the paint layer, then filling the mold with a starting material, and curing the starting material inside the mold to form the object, wherein the paint layer is cured in the mold only during and/or after the starting material is placed in the mold.

2. A method according to claim 1, wherein the paint in the paint layer is partially cured before it is placed in the mold.

3. A method according to claim 1, wherein the paint in the paint layer is cured in the mold.

4. A method according to claim 1, wherein the paint in paint layer is partially and/or fully cured by electromagnetic radiation.

5. A method according to claim 4, wherein the paint in paint layer is cured by electromagnetic radiation whose wavelength is below the visible spectrum.

6. A method according to claim 1, wherein the paint has a glass transition temperature below 40° C.

7. A method according to claim 6, wherein the paint has a glass transition temperature below 30° C.

8. A method according to claim 1, wherein said paint layer comprises plural layers and at least the outermost one of the layers, which is located on the visible side, is capable of being finish-cured by electromagnetic radiation.

9. A method according to claim 8, wherein the outermost layer is made of clear lacquer.

10. A method according to claim 8, wherein said paint layer comprises at least one color- and/or effect- producing layer and an outer layer that is at least indirectly located thereon on the visible side, further comprising curing said outer layer by means of electromagnetic radiation, while the color- and/or effect-producing layer remains in a thermoplastic state during the final curing of the outer layer.

11. A method according to claim 1, wherein said paint layer comprises plural layers and the outermost one of the layers is cured by thermosetting.

12. A method according to claim 11, wherein the outermost layer is made of clear lacquer.

13. A method according to claim 12, wherein the outermost layer comprises phosphazene, a phosphazene resin, a derivative of phosphazene or a phosphazene resin, a preproduct of phosphazene or a phosphazene resin, or mixtures thereof as a binder.

14. A method according to claim 12, wherein the outermost layer comprises an acrylate, an acrylate derivative, an acrylate preproduct, or mixtures thereof.

15. A method according to claim 1, wherein the paint film further comprises an adhesive layer located directly on the paint layer.

16. A paint film for applying to an object in a mold during a creative shaping process, comprising:
   a paint layer; and
   an adhesive layer,
   wherein the paint in the paint layer is partially cured without an adhesive before it is placed in a mold and is capable of being final cured by electromagnetic radiation.

17. A paint film according to claim 16, wherein the electromagnetic radiation has a wavelength below the visible spectrum.

18. A paint film according to claim 16, wherein the paint has a glass transition temperature below 40° C.

19. A paint film according to claim 15, wherein the paint has a glass transition temperature below 30° C.

20. A paint film according to claim 16, wherein said paint layer comprises plural layers and at least the outermost one of the layers, which is located on the visible side, is capable of being finish-cured by electromagnetic radiation.

21. A paint film according to claim 20, wherein the outermost layer is made of clear lacquer.

22. A paint film according to claim 16, wherein said paint layer comprises at least one color- and/or effect- producing layer and an outer layer that is at least indirectly located thereon on the visible side, wherein the outer layer is capable of being final-cured by electromagnetic radiation, while the color- and /or effect- producing layer remains thermoplastic following final curing of the outer layer.

23. A paint film according to claim 16, wherein said paint layer comprises plural layers and the outermost one of the layers is capable of being cured by thermosetting.

24. A paint film according to claim 23, wherein the outermost layer is made of clear lacquer.

25. A paint film according to claim 24, wherein the outermost layer comprises phosphazene, a phosphazene resin, a derivative of phosphazene or a phosphazene resin, a preproduct of phosphazene or a phosphazene resin, or mixtures thereof as a binder.

26. A paint film according to claim 24, wherein the outermost layer comprises urethane, a urethane derivative, a urethane preproduct, or mixtures thereof.

27. A paint film according to claim 24, wherein the outermost layer comprises an acrylate, an acrylate derivative, an acrylate preproduct, or mixtures thereof.

28. A paint film according to claim 16, wherein the paint film further comprises an adhesive layer located directly on the paint layer.

* * * * *